2,970,163
SALICYLIC ACID COMPOSITIONS AND METHOD OF REACTING SAME

Roy T. Gottesman, Glen Rock, N.J., and John E. Snow, Clearfield, Pa., assignors to Heyden Newport Chemical Corporation, New York, N.Y., a corporation of Delaware No Drawing. Filed Aug. 27, 1957, Ser. No. 680,631

11 Claims. (Cl. 260—435)

The present invention relates to novel salicyclic acid compositions adapted to provide improved lead salicylate and similar salts and relates more particularly to such a composition characterized by possessing improved flow characteristics, or by imparting more desirable crystal characteristics to said salts, or by both. The present invention also is concerned with an improved method of producing such salts.

Lead salicylate, which is used extensively as a heat- and light-stabilizer for polyvinyl resins, is generally prepared by the addition of salicylic acid to a suspension of litharge in water. This addition results in the formation of a suspension of large, needle-like crystals of lead salicylate in water. These crystals form agglomerates, and the suspension cannot be stirred or poured easily. Furthermore, the drying of these agglomerated crystals is difficult to accomplish and cannot be carried out in ordinary mechanical dryers. It is an object of this invention to so modify salicyclic acid that the lead salt resulting from its reaction with litharge in water forms a suspension that can be stirred, poured, and dried without difficulty.

Another problem encountered in the preparation of lead salicylate by the procedure described involves the handling characteristics of the salicyclic acid. Salicyclic acid is generally obtained as long, needle-like crystals or as a fluffy crystalline powder. Because of its physical state, salicyclic acid does not flow readily and is therefore difficult to handle in industrial materials transferring equipment. In addition, salicylic acid tends to cake on storage. It is an object of this invention to modify salicyclic acid so as to render it free-flowing and to prevent its caking on storage.

It is a further object of the invention to accomplish the foregoing modifications of salicyclic acid without affecting the properties of polyvinyl resins containing the lead salt as a heat- and light-stabilizer.

It has been found that the addition to salicyclic acid of citric acid [$C_3H_4(OH)(COOH)_3$] and an inert, finely-divided material results in a free-flowing product which can be reacted with litharge in water to form lead salicylate which has excellent flow and handling characteristics. The crystals of lead salicylate formed in this way are small prisms or short needles which show no tendency to form agglomerates. A suspension of these crystals in water is free-flowing, and it can be stirred, poured, and dried without difficulty. The presence of these additives in the salicyclic acid has no adverse effect on the properties of polyvinyl resins containing the lead salicylate.

The conditions under which the reaction of salicyclic acid and litharge is carried out have little effect on the characteristics of the resulting salt. While any convenient temperature can be used, the reaction is generally carried out at room temperature or slightly above. The course of this reaction can be illustrated by the following equation:

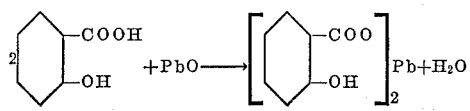

The amount of water present during the reaction has little effect on the size of the crystals formed. In the absence of citric acid, stirring and handling problems are encountered regardless of whether a small amount of water or a relatively large amount of water is used. This is the result of the tendency of the large needle-like crystals of lead salicylate to agglomerate. The presence of citric acid causes the formation of small crystals of lead salicylate regardless of the amount of water present.

The citric acid can be blended with the salicylic acid, or it can be added to the litharge suspension prior to or during the addition of salicylic acid.

The mixture of litharge, salicylic acid, citric acid and water preferably is stirred for approximately 30 minutes to insure completion of the reaction. This period may be lengthened without affecting the crystal properties of the lead salt. Shorter reaction periods may result in a product containing small amounts of unreacted litharge and salicylic acid.

Either technical salicylic acid or U.S.P. sublimed material can be used in this reaction; any of the standard commercial grades of litharge can be used.

Instead of citric acid, 4-hydroxyisophthalic acid,

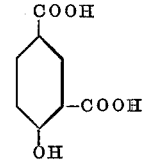

can be added to salicyclic acid to cause its lead salt to form as small crystals which can be readily stirred, poured, and dried. Because of its present commercial availability and low cost, however, citric acid is the preferred additive. Either anhydrous citric acid or the monohydrate can be used. The amount of additive generally employed is 0.75% to 5%, based on the weight of salicylic acid, with 1.0% to 1.5% the preferred range. The use of smaller quantities is unsatisfactory in that the desired crystal effects are not obtained fully. Larger quantities can be added, but no pronounced advantage results from their presence.

The function of the inert, finely-divided material in the salicylic acid composition is to render the salicylic acid free-flowing and to prevent its caking on storage. The material added to the salicylic acid is inert in that it does not react with salicylic acid, litharge, or citric acid under the conditions previously described for the formation of lead salicylate. The finely-divided material may be, but is not necessarily, in the size range of colloidal particles. The inert, finely-divided material we prefer to use in the modification of salicylic acid is a silica aerogel, such as the "Santocel" CX brand of Monsanto Chemical Company. This material contains approximately 90% of silica, 3% of sodium sulfate, and 5% of volatile compounds. It has a dry bulk density of 3.5–4 pounds per cubic foot and an average particle size of 1–3 microns. Among the other inert, finely-divided materials used to improve the flow characteristics of salicylic acid is magnesium silicate.

Approximately 0.02% to 0.20%, based on the weight of salicylic acid, of the inert, finely-divided material is added to the solid particles of salicylic acid. The preferred range is 0.05% to 0.10%. The addition of less than approximately 0.02% does not bring about the desired improvement in the flow properties of salicylic acid; the use of more than approximately 0.20% results in a product containing more inorganic matter than is ordinarily desired in salicylic acid. However, where the presence of excess quantities of inert material or citric acid in the salicylic acid composition or its reaction products is not undesirable, a large excess of either or both may be used.

While the present invention is concerned with the modification of salicyclic acid with both citric acid and a finely-divided, inert material, either of these additives may be used singly to bring about improvements in the properties of salicyclic acid and its lead salt. Thus, salicylic acid containing silica aerogel is a free-flowing material which can be used in the production of methyl salicylate and other salicylate esters. While salicylic acid containing only citric acid does not flow freely, it can be reacted with litharge in water to form a suspension of small crystals of lead salicylate, which can be easily stirred, poured, and dried.

The test used to determine the flowability of salicylic acid calls for measurement of the time required for a weighed sample to flow through a standard funnel. At the same time, it is noted whether the material flows freely from the funnel or light tapping on the brim of the funnel is required to initiate flow and/or to empty the funnel. The standard funnel used in the flowability tests mentioned in the examples that follow was a glass powder funnel 100 mm. in diameter, which had a stem 25 mm. long and 15 mm. in diameter.

Example I

Fifteen hundred grams of salicyclic acid were mixed with 0.75 gram of silica aerogel ("Santocel" CX brand, Monsanto Chemical Company) until a uniform blend was obtained. In flowability tests 10 grams of this mixture flowed from a standard powder funnel in 4 seconds after one tap, whereas a 10 gram sample of untreated salicylic acid flowed from the funnel in 202 seconds with tapping required throughout the test.

Example II

Salicylic acid was thoroughly mixed with 0.02% by weight of silica aerogel ("Santocel" CX brand, Monsanto Chemical Company). In this case, the treated salicylic acid flowed from the standard powder funnel in 17.2 seconds with tapping.

Example III

When U.S.P. sublimed salicylic acid was treated with small amounts of "Santocel" CX brand silica aerogel, its flow properties were improved as shown below:

| Percent "Santocel" CX Added | Flowability Test (Seconds/50 g. sample through standard funnel) |
| --- | --- |
| None | Did not flow even with tapping. |
| 0.02 | 15 seconds with tapping. |
| 0.05 | 11 seconds without tapping. |

Example IV

Salicylic acid was blended thoroughly with 0.05% of "Magnesol" brand magnesium silicate (Westvaco Chemical Division Food Machinery and Chemical Corporation). Ten grams of the mixture flowed through the standard powder funnel in 27 seconds with tapping; a ten gram sample of untreated salicylic acid flowed through the test funnel in 202 seconds with tapping.

Example V

To salicylic acid there was added 1% of citric acid and 0.10% of "Santocel" CX brand of silica aerogel. After thorough mixing, 10 grams of the modified salicylic acid flowed through the test funnel in 4 seconds without tapping. This material did not cake on storage, whereas unmodified salicylic acid caked on storage for five days.

Example VI

To a slurry of 28 grams (0.125 mole) of litharge in 275 ml. of water there was added in small portions over a period of 30 minutes 34.7 grams (0.25 mole) of the modified salicylic acid described in Example V. The slurry was maintained at 30–35° C. throughout the reaction. The resulting slurry, which was easily stirrable and pourable, was stirred for an additional 30 minutes and was then dried in a dryer. Microscopic examination of the product showed it to consist of small prismatic crystals. When it was included in a vinyl resin composition, the lead salicylate prepared from modified salicylic acid was found to be an effective heat- and light-stabilizer.

Example VII 4-hydroxyisophthalic acid (1%) was added to salicylic acid, and the mixture was blended until the 4-hydroxyisophthalic acid was evenly dispersed throughout the salicylic acid. When this modified salicylic acid was used in the preparation of lead salicylate by the procedure described in Example VI, the product was obtained in the form of free-flowing, short needles that did not tend to agglomerate.

Example VIII

Salicylic acid was blended with 1% by weight of 4-hydroxyisophthalic acid and 0.05% of "Santocel" CX brand of silica aerogel. When this modified salicylic acid was used in the preparation of lead salicylate by the procedure described in Example VI, the product obtained was in the form of free-flowing, short crystals.

Example IX

This comparative procedure was carried out in the same manner as that described in Example VI. To slurry of 28 grams of litharge in 275 ml. of water and while at a temperature of 30–35° C., there was added in small portions 34.7 grams of salicylic acid over a period of 30 minutes. The salicylic acid had been mixed with 0.05% of silica aerogel ("Santocel" CX). The crystals of the resulting slurry agglomerated as a heavy mass in mounds which could not be stirred or poured from the container. Microscopic examination showed the agglomerated crystals were long needle-like crystals.

Having described the present invention in detail, it is obvious that various modifications can be made therein without departing from the spirit or scope of the invention. The amount of water used to form the suspension of litharge particles is not critical, at least sufficient water preferably being used to form a suspension which can be readily agitated or stirred, but a large excess of water does no particular harm. While salicylic acid readily reacts with litharge at rom temperature, higher temperatures may be used to effect the reaction more rapidly and lower temperatures can be used, particularly where time is not important. Preferably, approximately stoichiometric amounts of salicylic acid and litharge are used, that is, 2 moles of acid per mole of litharge. However, an excess of either salicylic acid or litharge may be used, particularly where the presence of an excess of the reactant in the lead salicylate is not undesirable. Of course, any unreacted salicylic acid or litharge can be removed from the lead salicylate. Amounts of citric acid and finely-divided, inert material larger than those mentioned specifically can be used and, for example, 10% or more of either may be added to the salicylic acid, particularly when the presence of excessive amounts of these additives does no harm.

We claim:

1. In the process of preparing lead salicylate by adding salicylic acid to a suspension of litharge in an aqueous medium and reacting the salicylic acid with the litharge to form lead salicylate, the improvement comprising adding to such salicylic acid a hydroxy acid selected from the group consisting of citric acid, 4-hydroxyisophthalic acid, and mixtures thereof and carrying out said reaction in the presence of said hydroxy acid.

2. In the process of preparing lead salicylate by adding salicylic acid to litharge while suspended in an aqueous medium and reacting the salicylic acid and litharge to form lead salicylate, the improvement comprising adding to the salicylic acid 0.75% to 5% of a hydroxy acid based on the weight of salicylic acid, said hydroxy acid being selected from the group consisting of citric acid, 4-hydroxyisophthalic acid, and mixtures thereof, and carrying out said reaction in the presence of said hydroxy acid.

3. The process of preparing lead salicylate comprising reacting salicylic acid with litharge in the presence of 0.75% to 5% of a compound selected from the group consisting of citric acid and 4-hydroxyisophthalic acid, the litharge being suspended in water during the reaction and said compound being added to the litharge suspension prior to or during the reaction of the salicylic acid with the litharge.

4. A salicylic acid composition comprising salicylic acid and 0.75% to 5% of citric acid based on the weight of salicylic acid.

5. A salicylic acid composition comprising salicylic acid and 1.0% to 1.5% of citric acid based on the weight of salicylic acid.

6. A salicylic acid composition comprising salicylic acid particles, 0.02% to 0.20% of a finely-divided, inert material, selected from the group consisting of silica, magnesium silicate, and mixtures thereof and at least 0.75% of acid selected from the group consisting of citric acid, 4-hydroxyisophthalic acid and mixtures thereof, said percentages being based on the weight of salicylic acid.

7. A free-flowing salicylic acid composition comprising salicylic acid, 0.05% to 0.10% of silica, and 1.0% to 1.5% of citric acid.

8. A salicylic acid composition comprising crystalline salicylic acid and 0.02 to 0.20%, based on the weight of salicylic acid, of a finely-divided, inert material selected from the group consisting of silica, magnesium silicate, and mixtures thereof.

9. A free-flowing salicylic acid composition comprising salicylic acid, 0.02% to 0.20% of magnesium silicate, and 0.75% to 5% of citric acid.

10. A free-flowing salicylic acid composition comprising salicylic acid, 0.05 to 0.10% of silica, and 1.0% to 1.5% of 4-hydroxyisophthalic acid.

11. A salicylic acid composition comprising salicylic acid and from 0.75% to 5% of a compound selected from the group consisting of citric acid, 4-hydroxyisophthalic acid, and mixtures thereof, the amount of said compound being based on the amount of salicylic acid.

References Cited in the file of this patent

UNITED STATES PATENTS

| | | |
|---|---|---|
| 2,257,545 | Curtis | Sept. 30, 1941 |
| 2,410,977 | Kebrich | Nov. 12, 1946 |

FOREIGN PATENTS

| | | |
|---|---|---|
| 459,655 | Canada | Sept. 13, 1946 |

OTHER REFERENCES

Gregory et al., "Uses and Applications of Chemicals and Related Materials," New York, 1938, page 192.